Nov. 4, 1969  P. DOSCH ETAL  3,477,021
VOLUME MEASUREMENT OF THREAD DEFECTS BY DIRECTLY
INTEGRATING SIGNALS REPRESENTING
VARIATIONS IN THREAD THICKNESS
Filed July 18, 1966  3 Sheets-Sheet 3
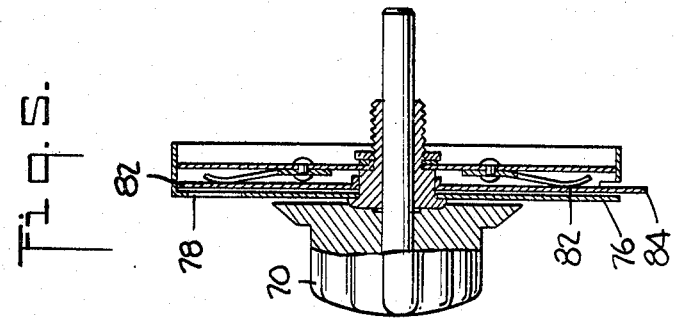
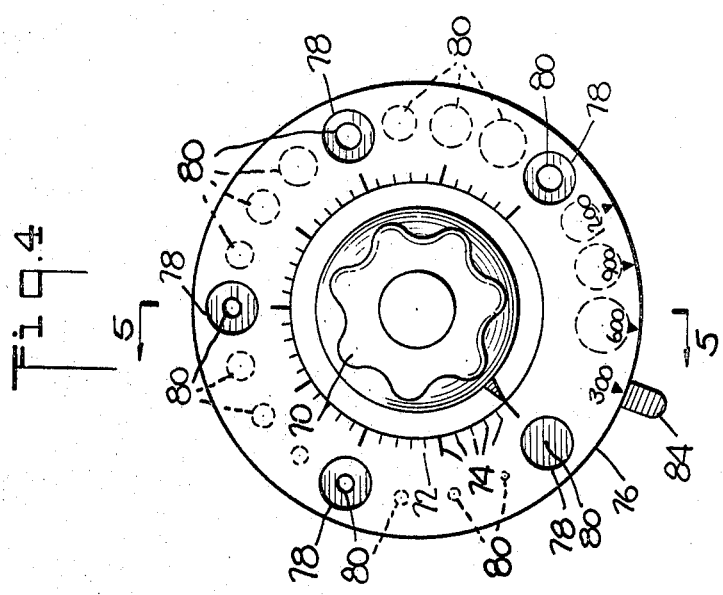
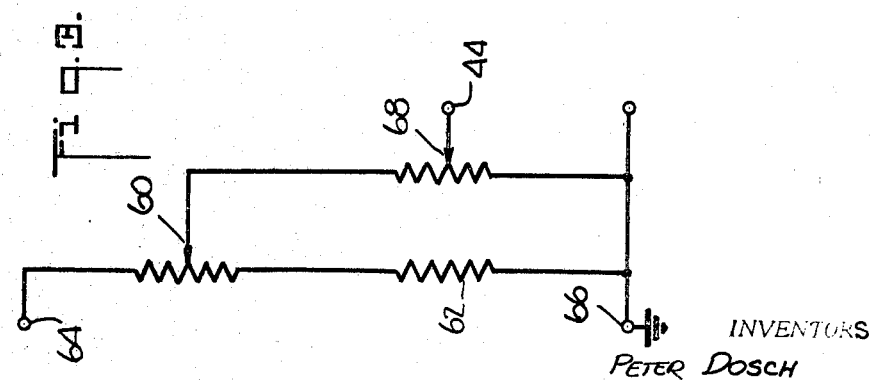
INVENTORS
PETER DOSCH
BY REINHARD H. HECK
ATTORNEYS

United States Patent Office 3,477,021
Patented Nov. 4, 1969

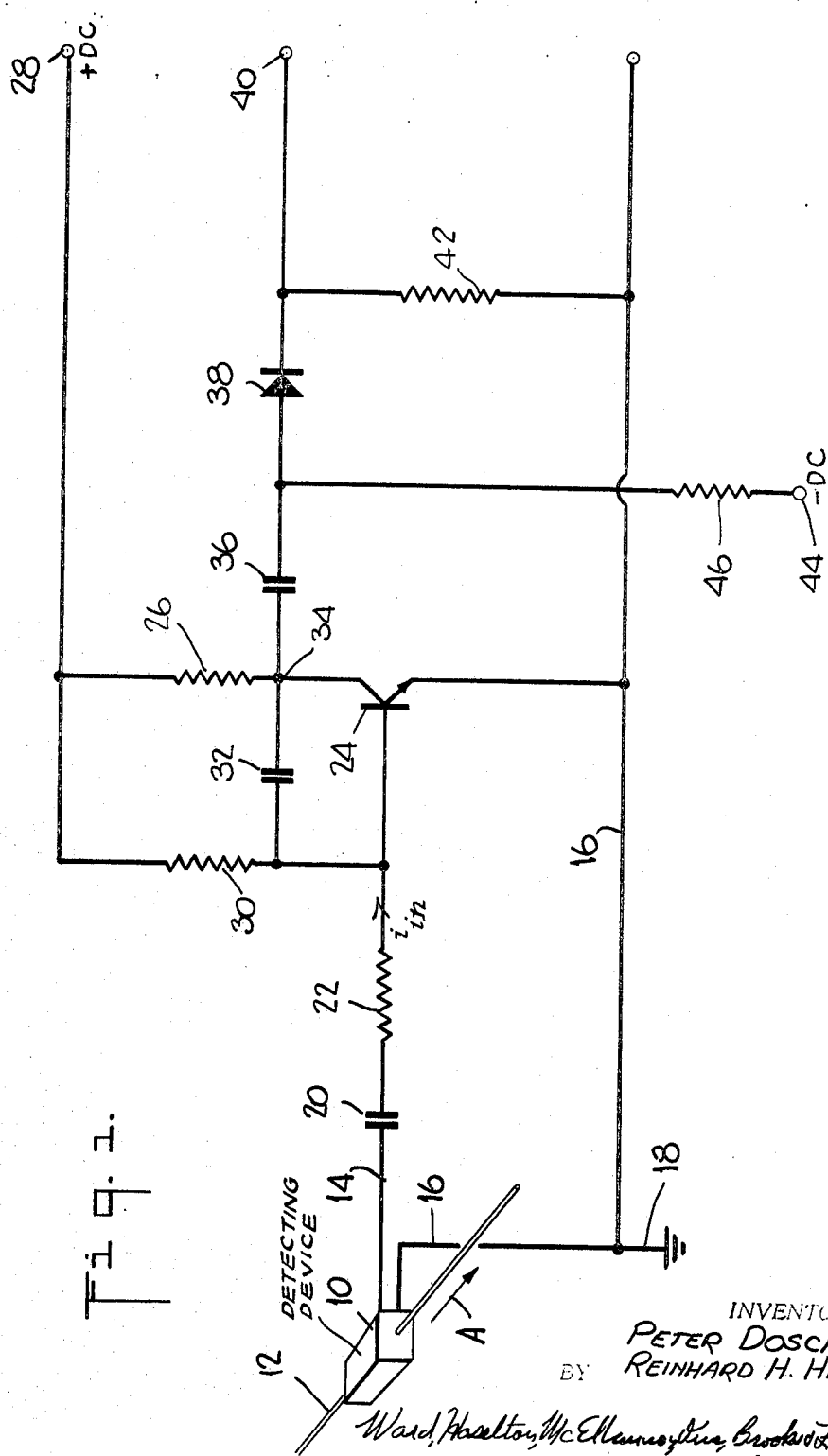

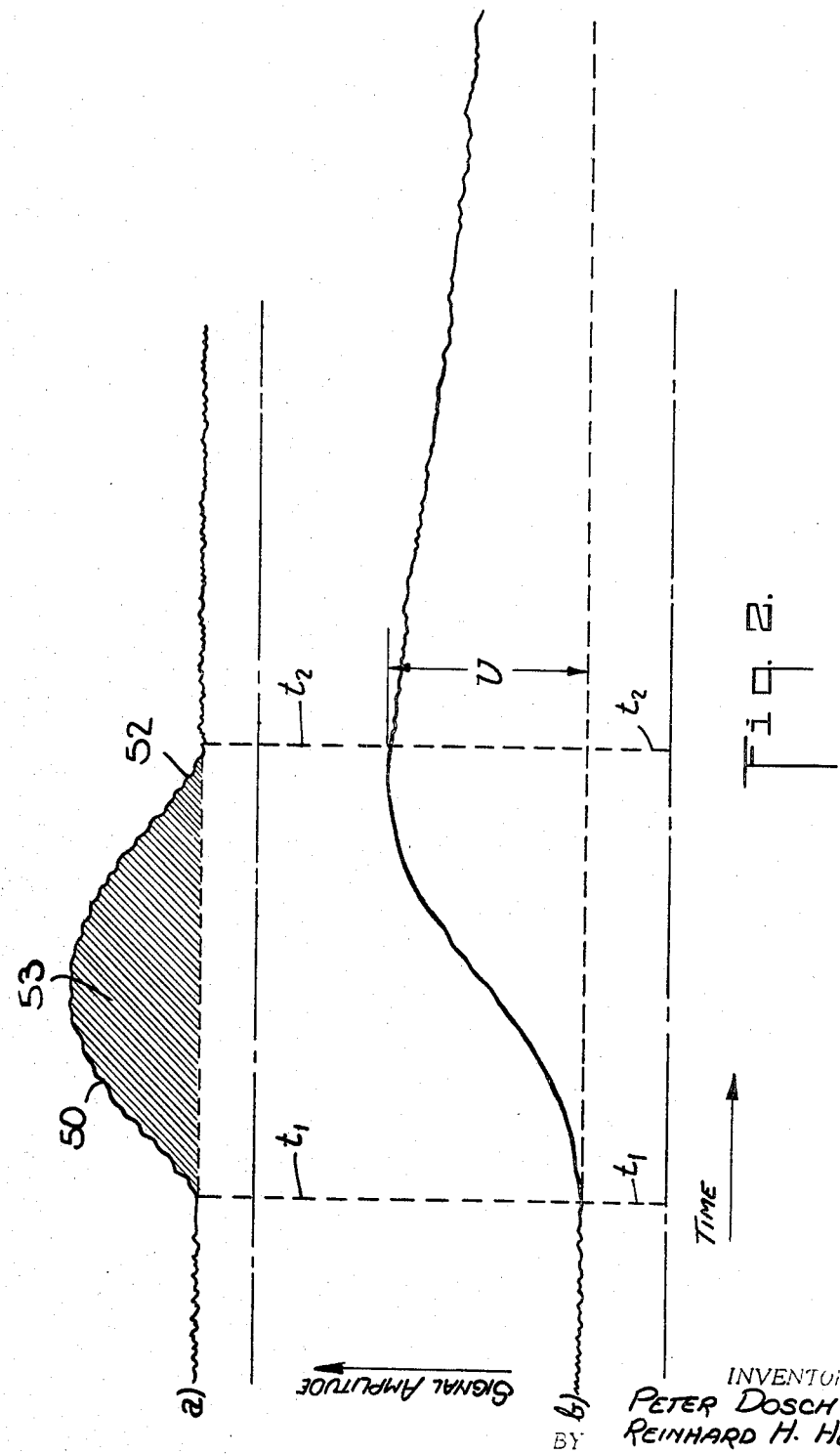

3,477,021
VOLUME MEASUREMENT OF THREAD DEFECTS BY DIRECTLY INTEGRATING SIGNALS REPRESENTING VARIATIONS IN THREAD THICKNESS
Peter Dosch, Jona im Rank, and Reinhard H. Heck, Wattwil, Switzerland, assignors to Heberlein & Co. AG, Gall, Switzerland, a corporation of Switzerland
Filed July 18, 1966, Ser. No. 566,008
Claims priority, application Germany, July 23, 1965, H 56,669
Int. Cl. G01r 27/26
U.S. Cl. 324—61
13 Claims

ABSTRACT OF THE DISCLOSURE

Method and apparatus for determining thread defects along the length of a thread by separately determining the volume of each thread defect; means are provided for electrically signaling the defects and for integrating the signals for each defect and for separately comparing each thus integrated signal with a bias signal.

---

This invention relates to the measurement of thread defects and more particularly it concerns improved arrangements for more realistically evaluating the condition of a thread.

The present invention is useful in connection with so-called slub catchers which measure thread defects and convert such measurements into electrical signals. The thread defects which a slub catcher monitors are the deviations in thickness or thinness of the thread from an average titer or diameter. Slub-catchers usually employ optical or capacitive measuring elements.

In addition to short term variations of the yarn or thread cross-section, the electrical signal is often also checked for long term variations of the cross-section of the yarns in order to recognize so-called double threads or "torpedos". This examination of long term defects will not be discussed here since the present invention only relates to the control of short term defects.

If a thread defect exceeds certain given dimensions, a checking process is initiated in slub-catchers which either consists in cutting the thread or in counting the defect. The present invention relates to a method for establishing the dimensions of the defect which must be exceeded to initiate the control operation. In the processes known up to now, in the most simple cases, the transgression of the fixed thickness of a defect initiates the control operation. This process is not satisfactory since it does not also take into account the length of the defect; and this must be considered for proper evaluation. Thus, short term defects often should not be eliminated even if they do exceed the established defect thickness. In improved processes, therefore, the length of the defect is also used to establish the acceptable dimensions of the defect. The length of the defect is herein defined as the length in which the defect exceeds a certain thickness of the thread. The measure of the defect is herein defined by the excess of a predetermined thickness as well as by the excess of a predetermined length, wherein those two quantities may be brought into deliberate connection with each other or respectively with other measuring quantities. (See also French patent 1,384,229, based upon Swiss patent application 15,076/62 and corresponding to United States No. 3,303,698 to Erich Loepfe.). Practice has shown that additional conditions have to be introduced in such a way that above a certain thickness of the defect, the control operation is initiated, even if the predetermined or established defect length is not exceeded; and conversely, should the defect exceed a certain length, even if the predetermined thickness of the defect is not exceeded, the control operation should be initiated. Thus the prior art methods have the disadvantage that besides requiring complicated electronic circuits, they also require the use of several controls and continuous adjustment thereof. The process of the present invention has the advantage of being extremely simple. As a measure of the defect which is to initiate the control operation, a predetermined quantity is established which will be hereinafter referred to as "defect volume." It is determined by integrating the electrical signal caused by the variations of thread over the time respectively the length of the defect. The control operation is then initiated upon the occurrence of a certain predetermined defect volume, irrespective of the shape of the defect, i.e. of whether it is longer and thinner or thicker and shorter or of any other circumferential shape. This condition will to a great extent depend upon the particular requirements of a given situation. The present process has the advantage that besides permitting a simplified electronic circuit, it requires only one control knob which is set to establish a predetermined defect volume.

The process of the present invention operates the more accurately when the measuring zone of the slub-catcher is kept short in the direction of the thread movement through the device. This is because the length of the defect is always falsified by the length of this measuring zone.

The signal which represents the defect volume also depends for its accuracy upon the running speed of the thread. This is because the length of the defect enters as time into the integration of the signal. The preset value of the defect volume must, therefore, be multiplied together with the running speed of the thread. This may be done conveniently by the person who operates the slub-catcher if the control knob is provided with a calibrated scale.

Another aspect of the invention resides in the provision of a dual potentiometer in which the running speed of the thread is set. It is also possible to change the indication of the volume of the defect on the different positions of the control knob by rotating an annular scale which is always set on the speed range being used. In such case the corresponding indications would appear in a cut-out section of the scale. As a further refinement, the indication of the controlled defect volume may be represented by symbols instead of numbers.

The running speed of the thread may also be compensated for by adjusting the sensitivity of the electric signal integrator in accordance with the thread running speed. This method, however, has the disadvantage that the adjustment must be made separately on each device.

A further compensating arrangement involves the provision of a logarithmic potentiometer or a stepswitch, the individual steps of which are logarithmically graduated for adjusting the predetermined acceptable defect volume. In order to consider the thread running speed, the scale disc may simply be rotated in accordance with the thread running speed.

There has thus been outlined rather broadly the more important features of the invention in order that the detailed description there of that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a circuit diagram illustrating one embodiment of the present invention;

FIG. 2 is a set of curves illustrating the correlation of signal variations at different locations in the circuit of FIG. 1;

FIG. 3 is a further circuit diagram illustrating a bias control useful in connection with the circuit of FIG. 1;

FIG. 4 is a front elevational view of a mechanical adjustment for operating various components of the circuit of FIG. 3; and FIG. 5 is a section view taken along line 5—5 of FIG. 4.

As shown in FIG. 1 there is provided a photoelectric thread thickness detecting device 10 through which a thread 12 proceeds in the direction of an arrow A. The detecting device 10 operates in a manner well known to the art to produce an electrical output voltage across a pair of lines 14 and 16 based upon the thickness of the portion of the thread 12 which happens to be passing through the device 10 at any instant. The line 16 is grounded as shown at 18 so that all thread thickness voltage signals will appear on the line 14.

An injut capacitor 20 and an input resistor 22 are connected in series along the line 14; and the line terminates at the base terminal of an amplifying transistor 24. The emitter of the transistor is directly connected to the grounded line 16; while its collector is connected via a collector resistor 26 to a power input terminal 28. Positive direct current potential from an external source (not shown) is applied continuously to the terminal 28. The terminal 28 is additionally connected via a base resistor 30 to the base terminal of the transistor 24. An integrating capacitor 32 is additionally connected between the transistor base and collector terminals.

Output from the transistor 24 is taken from a junction 34 at its collector terminal and this output is passed successively and in series through an output capacitor 36 and an output diode 38 to a signal output terminal 40. An output resistor 42 is connected between the grounded line 16 and and a point between the output diode 38 and the output terminal 40. Additionally a bias terminal 44 is connected via a bias resistor 46 to a point between the output capacitor 36 and the output diode 38. Negative bias voltages from another external source (not shown) may be supplied to the bias terminal 44 to control the operating conditions in the circuit.

In operation of the above described circuit the transistor 24 receives its operating voltage via the resistor 26 and this is set so that normally a constant continuous voltage appears at the output junction 34. Upon variations of the input signal, a corresponding input current $i_{in}$ flows through the input capacitor 20 and through the input resistor 22 to the base of the transistor 24. The collector voltage, at the junction 34, is thereby varied and accordingly a current, which is inversely proportional to the input current $i_{in}$ flows from the junction 34 back to the base of the transistor 24 through the integrating capacitor 32. The various circuit components are given proper values so that the current flowing back through the integrating capacitor 32 is always nearly equal to the input current. The voltage variation on the transistor collector which produces the current through the integrating capacitor 32 may then be stated as:

$$V = \int i_{in} dt$$

The voltage variation at the collector of the transistor 24 corresponds therefore to the integral of the defect or input signal; and accordingly it is a measure of defect volume. If this voltage variation exceeds a predetermined value ($-U_v$) the normally reverse biased output diode 38 begins to conduct and a voltage arises across the output resistor 42. This voltage may be supplied to a utilization means (not shown) such as an electronic switch.

FIGURE 2 shows a time comparison of the signal amplitudes on the line 14 (curve $a$) and at the junction 34 (curve $b$) when a typical thread defect passes through the detecting device 10. Before the defect enters the device, the input signal is of nearly constant magnitude and is only influenced slightly by the slight roughness of the thread. The thread defect beginning at $t_1$, causes the input signal to increase as at 50 while the defect passes through the measuring field of the detecting device 10. After the defect has passed, i.e., at $t_2$, the input signal again returns as at 52 to its original, practically constant value. The signal at the junction 34 (curve $b$) which also had a nearly constant value before the beginning of the defect, continuously increases during the passage of the defect; and this increase continues up to the end of the defect. The magnitude of the signal represented by curve $b$ at this point corresponds to the overall surface 53 and, consequently, to the defect volume. If the signal increase at the junction 34 exceeds the bias voltage U, a voltage arises across the output resistor 42 and at the signal output terminal 40. This signal may then be used to initiate operation of an alarm or other utilization means.

After the defect has passed, the voltage at the junction 34 again returns to its original value. The time constant or delay over which this return takes place may be deliberately chosen by adjusting or otherwise setting the values of the integrating capacitor 32 and of the base and collector resistors 30 and 26. This time constant is preferably adapted to the requirements of slub-catching. Defect signals which rise at a substantially slower rate than this time constant are then no longer controlled. These long term defects are detected by other measuring circuits previously mentioned.

FIGURE 3 shows a circuit which may be used to adjust the circuit of FIG. 1 to compensate for variations in thread speed. A first potentiometer 60 is connected in series with a resistor 62 between a negative voltage connection 64 and a ground connection 66. A second potentiometer 68 is connected between the adjustable terminal of the first of potentiometer 60 and ground. The pick-off or adjustable terminal of the second potentiometer 68 is connected to the bias terminal 44 of the circuit of FIG. 1. The circuit is so arranged that the output voltage of the pickoff arm of the second potentiometer 68 varies in proportion to the thread running speed. This is accomplished by adjusting the first potentiometer 60 in accordance with the thread running speed. The second potentiometer 68 is then used to preset the defect volume to be controlled. At the lowest thread running speed to be considered, the first potentiometer 60 is brought into its upmost position because then a certain defect yields a higher voltage-time integral. At the highest thread running speed to be considered, the first potentiometer 68 is brought into its lowest position. The intermediate potentiometer positions are set in accordance with the thread running speeds corresponding thereto. The positions of the second potentiometer 68 are set in accordance with the thread defect volumes corresponding thereto.

FIGS. 4 and 5 show a mechanical arrangement for compensating for thread running speed. In this case, a different value of the defect volume is associated with a certain position of the second or defect volume potentiometer 68 depending on the thread running speed. By means of a control knob 70 connected to the adjustable terminal of the second potentiometer 68, the defect volume to be controlled is preset on a scale 72. As shown, the scale is not provided with numbers, but with markings 74 on a stationary plate 76. The plate has circular openings 78 distributed thereabout; and through these openings different sized dots 80, corresponding to different defect volumes, can be seen. The dots 80 are printed on a rotatable plate 82 which is provided with a protruding arm 84 for adjustment in accordance with thread running speed. In the example shown, four positions with thread running speeds of between 300 and 1200 meters per minute are provided.

In operation, the arm 84 is set for a given thread running speed. This positions different sized dots 80 into alignment with the various openings 78. The control knob 70 is then set to point to the region of the markings 74 corresponding to a particular desired defect volume. As will be appreciated the arm 84 also sets the first potentiometer 60 while the knob 70 sets the second potentiometer 68 so that both thread running speed and defect volume are accurately correlated.

What is claimed as new and desired to be secured by Letters Patent is:

1. A method for determining the occurrence of undesirable defects in thread passing through an inspection area, said method comprising providing a first electrical signal indicating the instantaneous variations in thickness of said thread passing through said inspection area; directly integrating said first electrical signal with respect to time to provide a second electrical signal corresponding to the integral of all the variations in thickness of said thread; providing a reference signal corresponding to a predetermined maximum acceptable thread volume defect; and comparing said second electrical signal with said reference signal whereby the occurrence of said undesirable thread defects is indicated whenever said second electrical signal exceeds said reference signal.

2. A method as in claim 1 wherein said undesirable defects are determined by causing said thread to pass through a thread thickness detecting device using optical or capacitive measuring elements, respectively, which provide an output signal corresponding to said first electrical signal.

3. A method as in claim 2 wherein the step of integrating said first electrical signal is achieved by electrically integrating directly the output signal of said detecting device.

4. A method as in claim 2 including the additional step of adjusting said reference signal in accordance with the running speed of the thread passed said detecting device.

5. In combination, an electrical thread thickness measuring device for providing a first electrical signal indicating the instantaneous variations in thickness of a thread running through the device, an electrical integrating circuit connected to said device for directly integrating said first electrical signal with respect to time to provide a second electrical signal corresponding to the integral of all the variations in thickness of said thread running through said device, supply means for providing a reference signal corresponding to a predetermined maximum acceptable thread volume defect, and comparator means for comparing said second electrical signal with said reference signal whereby the occurrence of undesirable thread defects is indicated whenever said second electrical signal exceeds said reference signal.

6. The combination of claim 5 wherein said supply means comprises a first potentiometer adapted to be connected across a voltage source and adjustable in accordance with the speed of the thread running through said measuring device and a second potentiometer adjustable in accordance with different maximum acceptable thread volume defects, the second potentiometer being operatively connected to said first potentiometer to receive electrical potential from the adjustable element of the first potentiometer and the output of the second potentiometer being connected to the output of said integrating circuit.

7. The combination of claim 6 wherein said combination includes an adjusting knob, an intermediate stationary plate and a movable plate, said adjusting knob and movable plate being coaxially mounted on opposite sides of said intermediate stationary plate and connected to operate said first and second potentiometers and said stationary plate carrying indicia by which the adjustments of the adjusting knob and movable plate can be correlated.

8. The combination of claim 7 wherein said movable plate is provided with various indicia representative of said dfferent maximum acceptable thread volume defects and said stationary plate is provided with openings through which different ones of said indicia can be seen, and said adjusting knob is arranged to point to the location of a desired indicia.

9. The combination of claim 8 wherein said stationary plate is additionally provided with further indicia representative of different thread running speeds and said movable plate is arranged to be turned to a proper one of said further indicia.

10. The combination of claim 6 wherein said movable plate is connected to operate said first potentiometer and said adjusting knob is connected to operate said second potentiometer.

11. The combination of claim 5 wherein said signal integrating circuit comprises a transistor amplifier and a resistance-capacitance time delay circuit connected between its output and input.

12. In the combination of claim 7 wherein said second potentiometer is a logarithmic potentiometer which is adjustable in accordance with said predetermined maximum acceptable thread volume defects.

13. In the combination of claim 7 wherein said second potentiometer is a step-switch, the individual steps of which are logarithmically graduated for adjusting the predetermined maximum acceptable volume defects.

References Cited

UNITED STATES PATENTS

| | | | |
|---|---|---|---|
| 2,950,436 | 8/1960 | Butticaz et al. | 324—61 |
| 3,069,621 | 12/1962 | Butticaz et al. | 324—61 |
| 3,303,698 | 2/1967 | Loepfe | 324—61 XR |

EDWARD E. KUBASIEWICZ, Primary Examiner

U.S. Cl. X.R.

28—64; 73—160; 328—128; 250—219